Patented Sept. 28, 1943

UNITED STATES PATENT OFFICE 2,330,640

CATALYSIS

John W. Teter, Chicago, Ill., assignor to Sinclair Refining Company, New York, N. Y., a corporation of Maine No Drawing. Application April 19, 1941,
Serial No. 389,415

7 Claims. (Cl. 196—52)

This invention relates to the cracking of petroleum oil for the production of motor fuel or the like. It relates more particularly to a cracking process wherein the cracking reaction is promoted or aided by the use of an improved catalyst and the product thereof is a motor fuel of high anti-knock characteristics adapted to use in modern high compression internal combustion engines.

The desirable characteristics of a material which primarily qualify it for use as a catalyst in the cracking of hydrocarbon oils for the production of present day motor fuel are its ability to affect favorably the quantity and quality of motor fuel, i. e. its ability to produce high anti-knock gasoline with a minimum production of fixed gases; its ability to retain its catalytic properties over reasonably prolonged periods of use without the necessity of regeneration; and an ability to withstand repeated regenerations without excessive diminution of its catalytic effectiveness. My invention contemplates the use of an improved catalyst which embodies these desirable characteristics to a degree not heretofore obtainable.

The catalysts employed in my improved process are herein designated "aerogels." These aerogels are extremely light, porous materials resembling in some respects ordinary aquagels, such as silica gels and the like previously proposed as catalysts for similar cracking reactions, but they have other unique characteristics which make them superior to the corresponding aquagels as catalysts for use in the cracking of petroleum oils.

These aerogels, as used in accordance with my invention, are substantially free from moisture and may be used in a finely divided form dispersed in the body of hydrocarbon oil undergoing cracking; for example, the finely divided aerogel catalysts may be dispersed in a highly heated stream of oil passing through the cracking coil or in a large body of oil maintained at a suitable cracking temperature. Also, favorable cracking may be accomplished, in accordance with my invention, by suspending a bed of the catalyst in the path of the oil and passing the oil therethrough at a cracking temperature.

It has been proposed heretofore to crack petroleum oils in the presence of finely divided catalysts dispersed within the oil. Thus it is proposed in the co-pending application Serial No. 167,716, filed February 12, 1927, by E. C. Herthel, to maintain a quantity of fuller's earth or similar adsorbent material in intimate admixture with oil undergoing cracking, the velocity of the oil circulating through the still being maintained sufficiently high to insure the continuance of the fuller's earth in intimate admixture with the oil present invention permits attainment of several important advantages in processes of the type therein described.

Numerous materials have been proposed as catalysts in the cracking of hydrocarbon oil and a greater or less degree of success has been derived from their use in cracking processes. Various materials capable of forming gels such as silica, alumina and the like have been used to advantage in the form herein designated "aquagels." I have discovered that the use of such catalyst in the form of aerogels in the cracking of hydrocarbon oils has several decided advantages over the use of the ordinary aquagels.

As previously stated, these aerogel catalysts may be used in accordance with my invention as a porous bed through which the heated oil undergoing cracking is caused to pass. However, the bed of catalyst gradually loses its effectiveness as the operation continues and regeneration or replacement by additional catalyst becomes necessary.

In the preferred embodiment of my improved process the operation is of a continuous type and the aerogel catalyst in a finely divided condition is dispersed within the body or stream of oil undergoing cracking. This oil undergoing cracking may be either in the liquid or the vapor phase and the catalyst maintained in suspension therein by means of agitation or rapid circulation. I have found these aerogel catalysts peculiarly adapted to this latter type of operation because of the relative ease with which their suspension in the body or stream of oil or oil vapor may be accomplished and maintained, due to their low apparent density.

My improved process has the further advantage of unusual economy with respect to the catalyst. These catalysts are relatively expensive and their cost is normally a considerable item in operating expense. I have found the aerogels to be more effective as cracking catalysts than the corresponding aquagels with respect to the yield of gasoline per pound of catalyst used. The effectiveness of the freshly prepared aerogel catalyst used in my improved process with respect to the quantity and quality of the resulting product, compares very favorably with that of the most effective cracking catalyst heretofore discovered. However, with respect to their retention of their catalytic effectiveness over periods of use and upon repeated regeneration for the removal of carbonaceous deposits and the like therefrom, these aerogel catalysts are superior to previously used cracking catalysts.

Greater economy and continuity of operation are possible because of the fact that such aerogel catalysts retain their activity for relatively long periods of use and because of their susceptibility in catalytic effectiveness as compared with aquagels and similar catalysts heretofore used in the cracking of hydrocarbon oil.

The use of aerogel catalysts in accordance with my invention has the further advantage that it is thereby possible substantially to reduce the quantity of fixed gases formed per barrel of gasoline produced. Other advantages will appear from the following more detailed description of my invention.

In general, metallic compounds or mixtures thereof which form aquagels, for example oxides of silicon, aluminum, zirconium, and the like, may be converted into these aerogels. Not only are the aerogels highly effective as catalysts in the cracking of hydrocarbon oil but their characteristics such as apparent density and catalytic activity can be controlled over a considerable range by the method of preparation so as to provide a catalyst of optimum characteristics for particular operating conditions.

These materials herein designated "aerogels" are substantially dehydrated gels derived in a coherent expanded condition from the corresponding hydrous gels by the removal of the liquid constituent therefrom without permitting the usual very substantial shrinking of the gel structure which occurs in the production of aquagels. For instance, the water of the aqueous solution in which the hydrous gel is originally formed may be replaced by another liquid which is completely miscible with the water but which has a critical temperature such that it may be expelled from the gel as a gas. Likewise, this displacement of water may be accomplished by employing a series of liquids each successively replacing the succeeding liquid but having progressively lower critical temperatures so that the last liquid of the series may be finally expelled as a gas.

For example, a mixed silica-alumina aerogel composed of 100 mols of $SiO_2$ to 8 mols of $Al_2O_3$ may be prepared as follows: Commercial sodium silicate solution of about 40 degrees Baumé ($Na_2O$ 8.9%, $SiO_2$ 27.6%) is diluted with an equal volume of water and cooled in an ice bath. An equal volume of dilute hydrochloric acid (1 part 38% HCl+1 part water) is then prepared and enough aluminum chloride added thereto to give a final mixture comprising 100 mols of $SiO_2$ and 8 mols of $Al_2O_3$. This acid solution is likewise cooled. The two cooled solutions are then slowly mixed and yield a clear solution which sets in about 15 minutes to a continuous hydrous gel through which the aluminum chloride is uniformly dispersed. This hydrous gel is then cut into pieces of convenient size and soaked overnight in an excess of aqueous ammonium hydroxide solution (28% $NH_4OH$) to precipitate aluminum hydroxide in the gel and to neutralize excess hydrochloric acid. The gel is then washed free of sodium and chlorine ions by percolating distilled water through and in contact with the gel.

At this stage the gel contains a relatively large proportion of water and is herein designated "hydrous gel." If at this stage the water content is removed by ordinary drying until it ceases to lose water at a temperature of about 250° F., the gel will shrink to about 20% of its original volume.

In preparing the aquagel catalyst herein referred to and used in the hereinafter-described comparative tests, the hydrous gel is dried at about 250° F. and broken into small particles. These particles which pass an 8 mesh screen and are retained on a 16 mesh screen are then calcined at 1200° F. for 6¾ hours before using in the aforementioned comparative tests.

In the preparation of the aerogels, instead of expelling the water from the hydrous gels by ordinary drying, as described above, the water is removed by first draining off the excess water and causing methyl alcohol or a similar solvent such as acetone, propane or the like to percolate through the gel until no further water appears in the effluent solvent. The alcohol-water mixture may be passed from the percolator to a fractionating still for separating the alcohol from the water and the water-free alcohol returned to the percolator.

The gel in which the water has been completely replaced by the alcohol is then placed in a pressure-bomb in which it is still submerged in alcohol. The bomb is sealed and heated so that the critical pressure of the alcohol is rapidly exceeded. The heating is continued until the critical temperature of the alcohol is reached. The vapors are then slowly released from the bomb while the temperature of the bomb's contents is maintained in excess of the critical temperature of the alcohol. When all of the gas has been released, the bomb is cooled and the resulting gel removed.

In this dehydrating process the gel loses only about 20% of its original volume. The product is extremely porous and has an exceptionally low apparent gravity. It usually has a brownish color due to the presence of reaction products of the alcohol. This gel is then calcined at a temperature of 1200° F. for 6¾ hours during which operation the brown discoloration completely disappears, leaving a white product herein designated "aerogel" which may be readily reduced to finely divided particles for use as a catalyst in accordance with my improved process for cracking hydrocarbon oil.

As previously stated, the hydrous gels lose approximately 80% of their volume upon being dehydrated to form aquagels while in the production of aerogels only about 20% in volume is lost. The apparent density of the aquagels prepared as described above, when reduced to a fineness of 8 to 16 mesh, was 0.505 gram per cubic centimeter while that of the aerogel of the same particle size was 0.104 gram per cubic centimeter. Aerogels of even lower apparent density can be prepared in the above-described manner by using more dilute solutions in preparation of the parent hydrous gel.

In the foregoing example, specific directions have been given for the preparation of an aerogel consisting of 100 mols silica to 8 mols of alumina. It will be understood that if the preparation of an aerogel consisting only of silica is desired this may be accomplished by omitting the aluminum chloride from the acid solution. Also gels containing various proportions of silica and alumina may be prepared by varying the proportions of silica and aluminum chloride used. Further, aerogels such as described above containing other metal oxides in addition to alumina or in place of alumina may be prepared by the method described above by adding a soluble salt, for instance a chloride of the metal, to the acid solution in the preparation of the hydrous gel from which the aerogel is finally prepared.

The apparent densities of these aerogel catalysts may be varied by a process which is substantially a combination of the two methods previously described herein for eliminating the water from the hydrous gel, i. e. by removing a portion of the water by ordinary drying such as used in the preparation of aquagels and displacing the remaining water by the method used in the preparation of aerogels. For example, the apparent density of the resultant aerogel may be decreased to a greater or less degree by draining the water from the washed hydrous gel and allowing the gel to dry slowly at room temperature to a greater or less extent. When the gel has thus lost sufficient water to reduce its density to a predetermined value, the remainder of the water is removed from the gel by the method previously described in preparation of aerogels. By this combined procedure aerogels of any desired density between that of the aerogel prepared without any previous drying to that of the completely dried aquagel may be obtained.

The point to which the drying should be continued in order to produce an aerogel of the desired density may be determined empirically. As a guide to the amount of drying required in the production of an aerogel of a particular density, I have found it desirable to calcine a small sample of the partially dried aquagel as a control for the drying step. From the weight of the calcined sample the grams of solid in a cubic centimeter of partially dried gel may be calculated. Though the relationship between this figure and the apparent density of the resultant aerogel varies somewhat for gels of different composition, a fair estimate of their relationship is given in the following table:

*Table I*

| Amount of solid in partially dried aquagel | Resulting aerogel apparent density (8–16 mesh particles calcined at 1200° F.) |
| --- | --- |
| Grams per c. c. | Grams per c. c. |
| 0.12 | 0.10 |
| 0.25 | 0.20 |
| 0.38 | 0.30 |
| 0.50 | 0.40 |

By this procedure gels of various composition have been prepared varying in apparent density from less than 0.1 up to 0.5. These aerogels may be used in a coarse, granular form or ground to a fine powder and used as such or the powder may be formed into pellets in a conventional manner.

These aerogel catalysts may be employed in accordance with my invention, as previously stated, in the form of a porous bed through which the hydrocarbons to be cracked are passed at a cracking temperature. In this type of operation contact of the hydrocarbons with the bed of catalyst must be interrupted periodically and the catalyst of the bed brought in contact with a regenerating medium such as hot oxidizing gases which burn out the coke, tars and other products which tend to mask the catalyst and decrease be employed as a bed, such as heretofore used in catalytic cracking, through which are passed successively a stream of hydrocarbons to be cracked, a purging fluid for removing entrapped hydrocarbon, a regenerating medium for burning out coke and heavy polymerization products and a purging fluid for removing the products of combustion.

Likewise, they may be employed as catalysts in the method and apparatus described and claimed in the co-pending applications of Oliver F. Campbell, Serial Nos. 290,398 and 290,399, filed August 16, 1939, the latter having issued as Patent No. 2,246,345, in which case the bed of aerogel catalyst is rotated successively and continuously through a cracking zone in which the hydrocarbons to be cracked are supplied susbtantially continuously, a first purging zone in which the rotating bed is cleaned of entrapped hydrocarbons, a regenerative zone in which the rotating bed is subjected to the action of hot oxidizing gases and a second purging zone in which the rotating catalyst is freed, at least in part, of entrapped products of combustion.

My invention also contemplates the use of these aerogel catalysts in cracking operations wherein the catalyst is maintained in a fixed bed and from which the catalyst is removed from time to time for regeneration or replacement.

However, according to the preferred embodiment of my invention, the aeogel catalyst is dispersed in a finely divided form in the liquid or vapor hydrocarbon oil being cracked. Thus, such catalyst may be employed in a variety of conventional pyrolytic cracking stills having a heating zone through which the material to be cracked is continuously passed carrying in suspension the finely divided catalyst, separating means being provided for removing catalysts from the system either periodically or continuously and supplying fresh or regenerated catalyst to the system. Normally the spent or partially spent catalyst so removed is regenerated and returned to the system for further use.

The results of tests set forth in the following Table II will further illustrate my invention and the advantages derived therefrom. In these tests fixed beds of catalyst were employed consisting of aerogels and aquagels of various apparent densities, each composed of approximately 100 mols of $SiO_2$ and 8 mols of $Al_2O_3$ and prepared as previously described. In each instance atmospheric pressure and a temperature of approximately 950° F. were maintained in the cracking zone. The oil being cracked was in each instance a virgin Mid-Continent gas oil of 34.6° A. P. I. and was circulated through the bed of catalyst at a space velocity, i. e. gallons of oil per hour per gallon of catalyst, of 4. The duration of each test was six hours and an equal volume of catalyst was used in each instance.

*Table II*

| | Test Run No. | | | | | | |
| --- | --- | --- | --- | --- | --- | --- | --- |
| | 1 | 2 | 3 | 4 | 5 | 6 | 7 |
| Catalyst | Aerogel | Aerogel | Aerogel | Aerogel | Aerogel | Aquagel | Aquagel |
| Apparent density of catalyst, grms./c. c. | 0.104 | 0.128 | 0.188 | 0.340 | 0.400 | 0.505 | 0.551 |
| Gasoline yield, gals./hr./lb. of catalyst | 0.43 | 0.41 | 0.22 | 0.25 | 0.25 | 0.21 | 0.17 |
| Gas yield (pentane-free), cu. ft./bbls. of gasoline | 460 | 510 | 740 | 1,060 | 530 | 1,120 | 980 |

In repeating these tests under the stated condition, excepting the substitution of a catalyst commols of Al₂O₃, results were obtained as recorded in the following Table III:

Al₂O₃ and having an apparent density of 0.104, was used. Other operating conditions and the

*Table III*

|  | Test Run No. | | | | |
| --- | --- | --- | --- | --- | --- |
|  | 8 | 9 | 10 | 11 | 12 |
| Catalyst | Aerogel | Aerogel | Aerogel | Aerogel | Aquagel |
| Apparent density of catalyst, grms./c. c. | .104 | .208 | .276 | .408 | .632 |
| Gasoline yield, gals./hr./lb. of catalyst | .23 | .19 | .18 | .22 | .17 |
| Gas yield (pentane-free), cu. ft./bbls. of gasoline | 710 | 590 | 630 | 725 | 890 |

From the results of these tests it appears that the gasoline yield per pound of catalyst used is materially higher where the catalyst was in the aerogel form than when the corresponding catalyst was in the form of the ordinary aquagel. It also appears that the production of fixed gases per gallon of gasoline produced by the process was with a single exception materially lower for the runs where the catalyst is used in the aerogel form. The gasoline produced, using the aerogel and aquagel catalyst, respectively, was very similar with respect to octane number and susceptibility to treatment with tetraethyl lead.

As previously stated, the test runs 1 to 12, inclusive, were at atmospheric pressure and approximately 950° F. It will be understood, however, that this type of operation may, in accordance with my invention, be carried out under superatmospheric pressure and under different cracking temperatures, as will be understood by those familiar with the art. For example, cracking temperatures within the range of 900 to 1000° F. have been found advantageous. Similarly, the space velocity of the oil may be varied.

The application of my invention to the type of operation previously indicated herein as my preferred type, and in which the catalyst is dispersed in the hydrocarbon being cracked, will be illustrated with reference to tests carried on in an experimental-sized apparatus.

The apparatus employed in these tests comprised a seamless cracking coil about 116 feet long and of 0.2165 inch inside diameter, this cracking coil being submerged in a lead bath. The finely divided catalyst was intimately dispersed in the charging oil and the dispersion maintained in the feed tank by means of agitation. From the feed tank the oil to be cracked with the catalyst suspended therein was pumped through the cracking coil wherein it was heated to a cracking temperature and the cracked oil carrying the catalyst in suspension was discharged from the outlet end of the coil through a cooler to a separator wherein the catalyst was separated from the oil. The hydrocarbon oil product of this cracking operation was what has been termed a "synthetic crude." The gasoline resulting from the cracking operation was separated from the synthetic crude by subsequent distillation and its quality and quantity noted. The fixed gases resulting from the cracking operation were separately recovered and measured. A second run in which no catalyst was used is included for comparison.

In each of these runs the charging stock was a Pennsylvania gas oil of 37.9° A. P. I. gravity and the temperature of the lead bath was approximately 1000° F. In run No. 13 no catalyst was employed. In run No. 14, 1.0% by weight, based on the amount of oil charged, of aerogel results obtained were as indicated in the following Table IV:

*Table IV*

|  | Test Run No. | |
| --- | --- | --- |
|  | 13 | 14 |
| Catalyst | None | Aerogel |
| Oil feed rate, c. c. /hour | 3,960 | 4,434 |
| Gauge pressure, lbs./sq. in. | 13 | 17 |
| Synthetic crude, vol. per cent | 88.2 | 89.4 |
| Gasoline, vol. per cent on synthetic crude | 12 | 18.3 |
| Gasoline, vol. per cent on charge | 10.6 | 16.3 |
| Gas produced per bbl. of charge, cu. ft. | 417 | 328 |
| Gas produced per bbl. of gasoline, cu. ft. | 3,480 | 1,600 |
| Octane number of gasoline: |  |  |
| Motor method | 68.4 | 75.6 |
| Research method | 78.0 | 89.7 |
| Motor method with 3 c. c. tetraethyl lead added per gallon | 76.2 | 79.9 |

In the above experiments the pressure on the process was controlled by a valve placed in the vapor release line leading from the synthetic crude receiver. These runs 13 and 14 serve as illustrations of the advantages of my improved process using aerogel catalyst as applied to the suspension type of operation with respect to gasoline yield and gas produced and also the improved anti-knock characteristics of the gasoline product.

In the apparatus used in runs Nos. 13 and 14, the temperature of the oil leaving the heating coil closely approximated the temperature of the lead bath, i. e. approximately 1000° F. The temperatures and pressures employed in this type of operation may be varied over a considerable range; for example, superatmospheric pressures as high as 60 pounds per square inch and even higher may be used. Temperatures of approximately 1000 to 1050° F. may advantageously be employed in this type of operation. Likewise, the proportions of catalyst used may be varied over a considerable range but from about 1 to 10% by weight of the charge oil are usually sufficient. The optimum proportion of catalyst depends to a considerable extent upon the apparent density of the catalyst, decreasing as the apparent density decreases.

In each of the foregoing illustrative runs, the catalyst used was a fresh virgin catalyst which had not been subjected to regeneration. From the data presented, it appears that the use of the catalyst in the aerogel form compares very favorably with the use of the corresponding aquagel catalyst where both catalysts are fresh and unregenerated and, in most instances, decidedly superior results were obtained.

However, one of the primary advantages of my use of the aerogel catalysts is the ability of such catalysts to withstand repeated regeneration with but relatively small loss of catalytic activity. In this respect the aerogel catalysts are other conventional cracking catalysts with which I am familiar.

The relative abilities of the aerogels and the aquagels to withstand repeated regeneration are illustrated by the test data presented in Table V. In these tests the catalytic activity of an aquagel and of an aerogel catalyst, each composed of 100 mols of $SiO_2$ and 8 mols of $Al_2O_3$, was determined under identical conditions both when fresh and after repeated regeneration.

In conducting these tests a given weight of the catalyst, ranging from 2 to 5 grams, was thoroughly mixed with 125 c. c. of 70 seconds Saybolt Universal viscosity miner's neutral from a Pennsylvania base, the mixture placed in a 250 c. c. distilling flask and distilled at the rate of approximately 2¼ c. c. per minute. The distillate from this cracking distillation was then distilled analytically in the usual manner, the percentage vaporized at 572° F. being noted. Catalytic activity was then expressed as the percentage of the distillate from the redistillation obtained up to 572° F. relative to that obtained under identical conditions using a standard specially treated catalyst.

After each test run the catalyst was removed from the distilling flask to a porcelain crucible and regenerated by heating to 1200° F. in a muffle furnace, corresponding catalysts being in each case heated simultaneously for identical periods of time until all the carbonaceous matter had been burned off. The burning periods for the several regenerations were, respectively, 2, 1¾, 1¼, 1¼, 1½, 1, 1, ¾, ¾ and ¾ hours.

The results of these tests are as follows:

*Table V*

| Catalyst | Weight of catalyst | Catalytic activity |
|---|---|---|
| | *Grams* | |
| Aquagel fresh | 5 | 91.5 |
| Aquagel— | | |
| After first regeneration | 3.75 | 54 |
| After second regeneration | 3.4 | 59 |
| After third regeneration | 2.5 | 42.5 |
| After fourth regeneration | 4.25 | 52 |
| After fifth regeneration | 3.9 | 50 |
| After sixth regeneration | 3.6 | 44 |
| After seventh regeneration | 3.3 | 35 |
| After eighth regeneration | 2.8 | 37 |
| After ninth regeneration | 2.5 | 28 |
| After tenth regeneration | 2 | 19 |
| Aerogel fresh | 5 | 78 |
| Aerogel— | | |
| After first regeneration | 3.75 | 70 |
| After second regeneration | 3.4 | 66 |
| After third regeneration | 2.5 | 57 |
| After fourth regeneration | 4.25 | 92 |
| After fifth regeneration | 3.9 | 72 |
| After sixth regeneration | 3.6 | 76 |
| After seventh regeneration | 3.3 | 78 |
| After eighth regeneration | 2.8 | 65 |
| After ninth regeneration | 2.5 | 68 |
| After tenth regeneration | 2.0 | 51 |

The values given above for chemical activity of the fresh aquagel catalyst and for the aquagel catalyst after the first, second and third regeneration, respectively, are the average values of duplicate tests in each of which the weight of catalyst used was that indicated in the above tabulation. In the test run after the fourth regeneration the regenerated aquagel catalyst from the preceding duplicate tests was combined. In the tests of the catalytic activity of the fresh and regenerated aerogel catalysts, which were made subsequent to the tests of the aquagel catalyst, the same procedure was followed and, in order that the tests might be strictly comparable, the weight of the aerogel catalyst was in each instance identical with the weight of the aquagel From the above data it appears that, though the catalytic activity of the fresh aquagel with respect to the quantity of low boiling distillate produced was slightly higher under the test conditions than the corresponding aerogel, after a single regeneration the catalytic activity of the aquagel had fallen to a point far below that of the aerogel. The superiority of the aerogels with respect to resistance to repeated regeneration persisted throughout the range covered by the tests and while, following the tenth regeneration, the catalytic activity of the aquagel had fallen to 19%, that of the aerogel was still 51%.

While I have illustrated only the resistance of a particular silica-alumina aerogel to repeated regeneration, the relative stability of other aerogels is comparable to that of the silica-alumina aerogel.

Generally, after four regenerations, the aquagels have lost about 60% or more of their activity in producing high octane gasoline while the activity of the aerogels in this respect persists to a much higher degree, particularly the aerogel catalyst composed of 100 mols of $SiO_2$ and 8 mols of $Al_2O_3$.

I claim:

1. Process for cracking petroleum oil to produce motor fuel having high anti-knock properties comprising intimately contacting the oil to be cracked while at a cracking temperature with a metal oxide catalyst in the form of an aerogel.

2. Process for cracking petroleum oil to produce motor fuel having high anti-knock properties comprising intimately contacting the oil to be cracked while at a cracking temperature with a metal oxide catalyst in the form of an aerogel having an apparent density not exceeding about 0.5.

3. Process for cracking petroleum oil to produce motor fuel having high anti-knock properties comprising intimately contacting the oil to be cracked while at a cracking temperature with a metal oxide catalyst in the form of an aerogel having an apparent density of about 0.1 to 0.2.

4. Process for cracking petroleum oil to produce motor fuel having high anti-knock properties comprising intimately contacting the oil to be cracked while at a cracking temperature with a catalyst composed of $SiO_2$ and $Al_2O_3$ in the form of an aerogel.

5. Process for cracking petroleum oil to produce motor fuel having high anti-knock properties comprising intimately contacting the oil to be cracked while at a cracking temperature with a catalyst composed of $SiO_2$, $ZrO_2$ and $Al_2O_3$ in the form of an aerogel.

6. Process for cracking petroleum oil to produce motor fuel having high anti-knock properties comprising heating the oil to be cracked to a cracking temperature while having intimately dispersed therein a metal oxide catalyst in the form of an aerogel.

7. In the method of producing motor fuel having high anti-knock properties by cracking petroleum oil wherein a metal oxide catalyst at least a substantial part of which has been regenerated is dispersed through the oil, the oil-catalyst mixture subjected to cracking treatment and the used catalyst separated from the oil regenerated and returned to the cracking treatment, the improvement comprising dispersing the metal oxide catalyst in the oil in the form of an aerogel.

JOHN W. TETER.

Disclaimer 2,330,640.—*John W. Teter*, Chicago, Ill. CATALYSIS. Patent dated Sept. 28, 1943. Disclaimer filed Dec. 2, 1950, by the assignee, *Sinclair Refining Company*.

Hereby enters this disclaimer to claims 6 and 7 of said patent.
[*Official Gazette January 2, 1951.*]